United States Patent [19]

Smith

[11] 4,386,869
[45] Jun. 7, 1983

[54] INTEGRALLY SEALED VIBRATION DAMPENING BALL AND SOCKET JOINTS

[75] Inventor: Joseph E. Smith, Birmingham, Mich.

[73] Assignee: Gulf & Western Manufacturing Company, Southfield, Mich.

[21] Appl. No.: 286,470

[22] Filed: Jul. 24, 1981

[51] Int. Cl.³ ............................................. F16C 11/06
[52] U.S. Cl. .................................... 403/39; 403/134; 403/136
[58] Field of Search ................. 308/39, 134, 136, 135, 308/140, 133, 132, 38, 36; 403/39, 134, 136

[56] References Cited

U.S. PATENT DOCUMENTS

| | | | |
|---|---|---|---|
| 3,350,122 | 10/1967 | Ulderup | 403/135 |
| 3,361,458 | 1/1968 | Herbenar | 403/38 |
| 4,003,666 | 1/1977 | Gaines et al. | 403/134 |
| 4,034,996 | 7/1977 | Manita et al. | 403/140 |

FOREIGN PATENT DOCUMENTS 1077899 8/1967 United Kingdom .

Primary Examiner—Lenard A. Footland
Attorney, Agent, or Firm—Hauke and Patalidis

[57] ABSTRACT

Integrally sealed vibration dampening ball and socket joints having a spherical member capable of swivelling relative to a socket member. A split metallic or high strength plastic bearing ring disposed with clearance in a shell has a concave spherical surface portion in swivelling engagement with the ball member, and a pair of symmetrically disposed resilient rings installed between the bearing ring and the inner surface of the shell constantly urge the bearing surface of the bearing ring in engagement with the spherical member surface to prevent rattle and to compensate for wear. Normal loads are taken by the resilient rings, and overload and shock load are taken by the bearing ring. A bellows seal, formed integrally with one of the resilient rings or, alternatively, formed separate is fastened at one end in the shell. The bellows seal is held elastically at its other end around a portion of the spherical member. A second seal, disposed in the same manner, seals the gap between the shell and the spherical member in structure where the spherical member is a hollow ball. Alternatively, the other end of the shell is closed by an integral or separate end cap in structures wherein the spherical member is a ball formed on the end of a stud. The bearings are prepacked with a lubricant.

48 Claims, 11 Drawing Figures

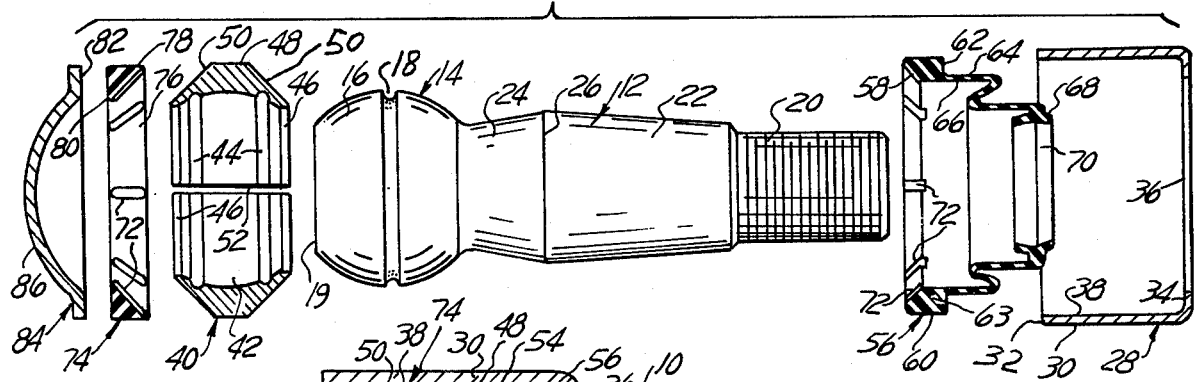
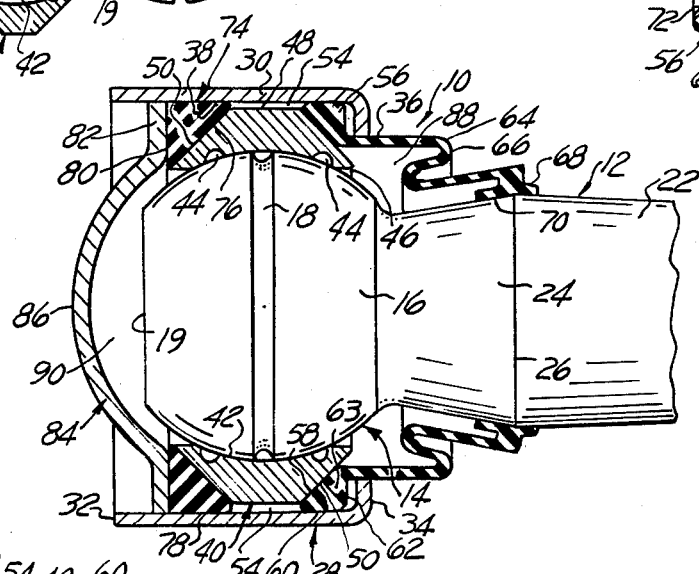
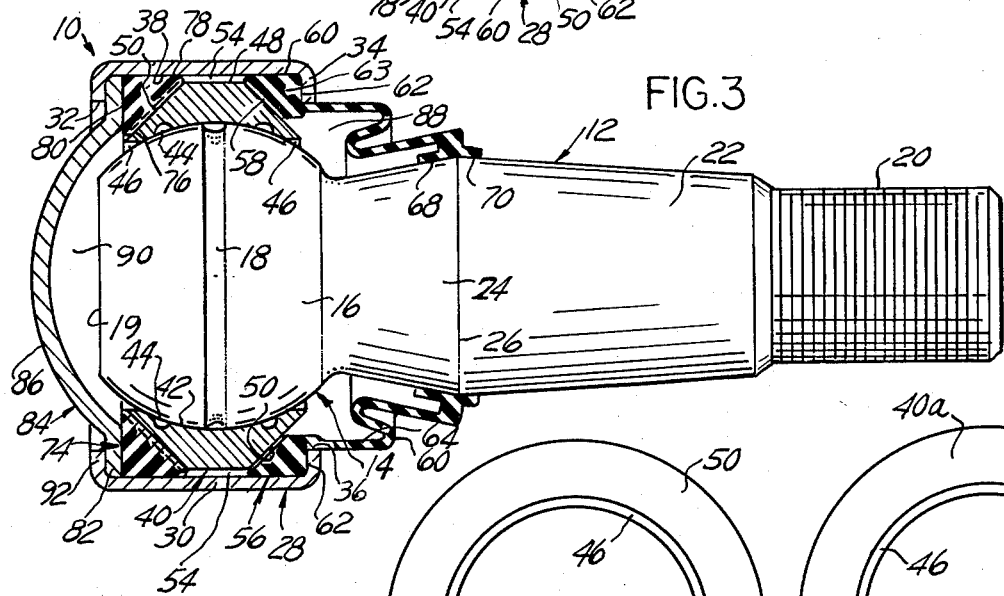
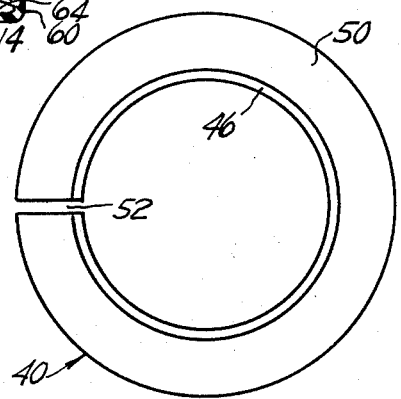

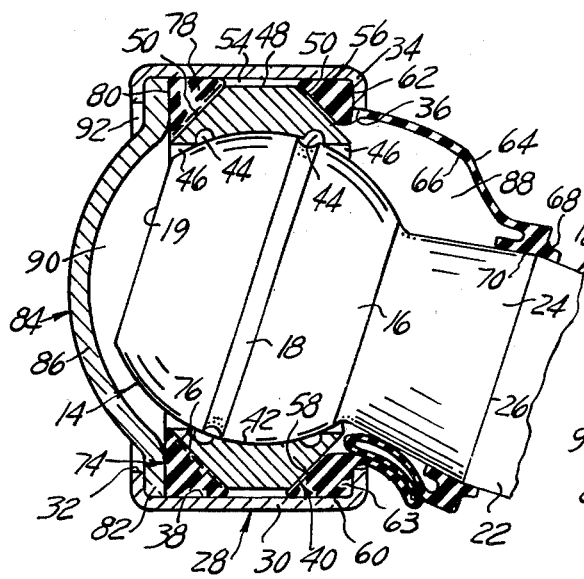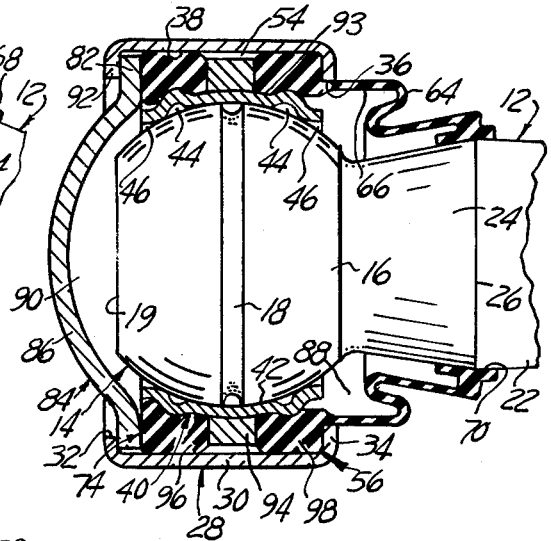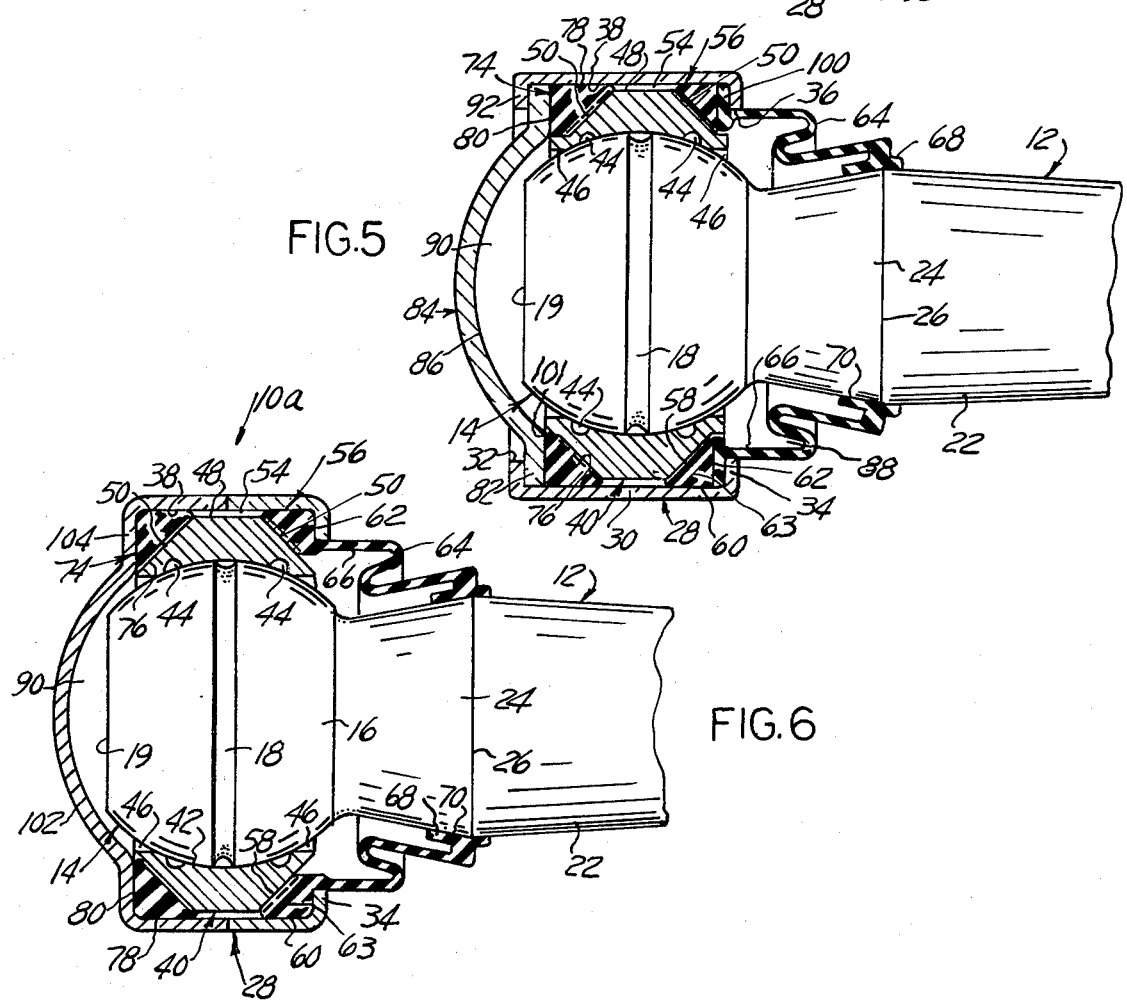

INTEGRALLY SEALED VIBRATION DAMPENING BALL AND SOCKET JOINTS

BACKGROUND OF THE INVENTION

The present invention relates to sealed bearings in general, and more particularly to hermetically sealed vibration dampening, low load and high load absorbing, knuckle or swivel joints of the ball and socket type.

Knuckle or swivel joints of the ball and socket type are of general use in motor vehicle steering tie rod assemblies, in drag links, torque rods, suspension stabilizers, shock absorbers and friction snubbers, for example. In heavy trucks, in military vehicles, in off-highway vehicles and in railroad vehicles, knuckle or swivel joints are required to accomplish their function under adverse ambient conditions with a long service life, with a minimum of maintenance or replacement, and they are often subjected to intense vibrations and excessive load forces in all directions.

The present invention provides ball and socket joints in the forme of integrally sealed units lubricated for life that are particularly well adapted to applications under demanding conditions, which present the advantages of dampening vibration between interconnected members, provide substantially resilient connections between interconnected members during low load carrying, which have solid non-resilient but non-rattling high load carrying capability and compensation for wear. In addition, the present invention provides knuckle or swivel joints that are easy to manufacture and that accept wide manufacturing tolerances and eliminate bearing lock-up during assembly.

The many objects and advantages of the present invention will become apparent to those skilled in the art when the following description of the best modes contemplated for practicing the invention is read in conjunction with the accompanying drawing, wherein like reference numerals refer to like or equivalent parts, and in which:

BRIEF DESCRIPTION OF THE DRAWINGS

FIG. 1 is an exploded partially sectional view of an example of knuckle or swivel joints of the stud-ball and socket type according to the invention;

FIGS. 1a and 1b are plan views of alternate structures for one of the elements of FIG. 1;

FIG. 2 is a sectional view corresponding to FIG. 1 with the diverse elements disposed in their relative position during assembly;

FIG. 3 is a view similar to FIG. 2 but showing the elements after assembly;

FIG. 3A is a view similar to FIG. 3 but showing the swivel and knuckle joint of the invention during angulation;

FIG. 4 is a view similar to FIG. 3 but showing a modification thereof;

FIG. 5 is a view similar to FIG. 3 but showing a further modification thereof;

FIG. 6 is a view similar to FIG. 3 but showing another modification thereof;

DETAILED DESCRIPTION OF THE PREFERRED EMBODIMENTS

Figure 7:
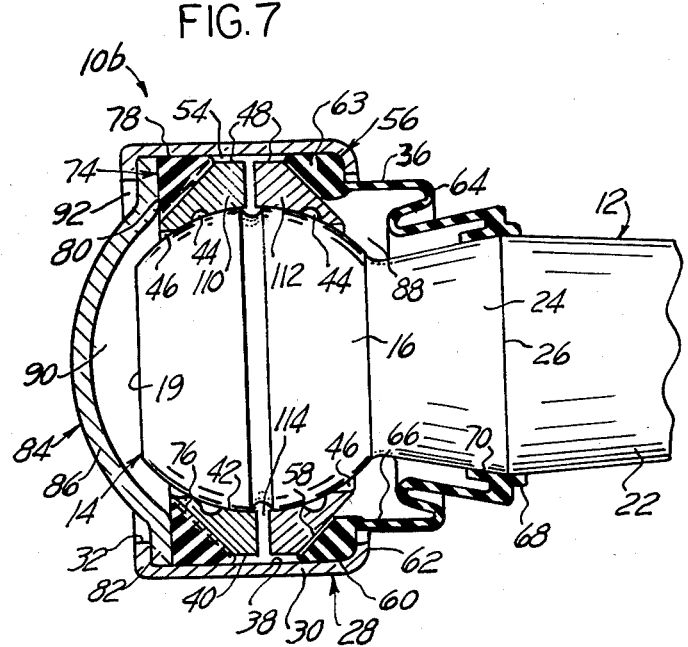
FIG. 7 is a view similar to FIG. 3 but showing still another modification thereof.

Referring to the drawings, and more particularly to FIGS. 1-3 and 3A thereof, an example of structure for a knuckle or swivel joint 10 according to the present invention comprises a stud 12 provided at one end with an integral cold-headed ball 14 having a peripheral convex spherical surface 16, provided with an equatorial annular lubrication groove 18 and a flat end face 19. The stud 12 has a cylindrical end portion 20 provided with a peripheral thread and a tapered portion 22 for engagement in the correspondingly tapered bore of a steering member, stabilizer arm or the like, not shown, a nut, not shown, threading over the threaded end 20 of the stud 12 providing fastening of the stud 12 to the member. In the example of structure illustrated, the tapered portion 22 of the stud 12 is integrally connected to the ball 14 by a portion having a reverse taper, as shown at 24, along a circular line 26.

The spherical member or ball 16 is, in assembly, disposed in a cylindrical housing or shell 28 having a tubular body portion 30, made of steel or similar material, provided with a straight rim 32 at one end, FIGS. 1 and 2, and a transverse radial flange 34 at the other end, the transverse flange 34 having an opening 36. The shell 28 has an internal bore 38 adapted to freely receive a bearing ring 40. The bearing ring 40, preferably made of steel, bronze or high strength plastic, has a spherical convex inner surface 42 conforming with the spherical surface 16 of the ball 14, and a pair of parallel annular grooves 44 each disposed proximate a tapered end 46 of the bearing ring. The bearing ring 40 has a cylindrical peripheral surface 48, and a pair of frusto-conical or inclined surfaces 50 joining the cylindrical peripheral surface 48 to the tapered ends 46 of the ring. The bearing ring 40 is made of a single piece, FIG. 1a, provided with a single radial slit 52 permitting the ring to elastically enlarge when slipped over the ball 14, and snap back in position with its spherical surface 42 in engagement with the spherical peripheral surface 16 of the ball 14 or, alternatively, the bearing ring 40 is made of two separate sections 40a and 40b, FIG. 1b, such that, when placed over the ball 14, the two half rings 40a, and 40b are separated by an average clearance gap 52a. The bearing ring may also be made of three, four or more portions. With the bearing ring 40 disposed around the ball 14, the overall outer diameter of the cylindrical peripheral surface 48 of the ring is slightly less than the diameter of the inner bore 38 of the shell 28, with the result that an annular clearance, shown somewhat exaggerated at 54, FIGS. 2-3A, exists all around the ring between its peripheral surface 48 and the surface of the internal bore 38 of the shell 28. The clearance 54 is very narrow and is preferably in the range of 100 to 400 microns, for example. However, it will be readily appreciated that, for some applications, the clearance 54 may be less than 100 microns or even that ball and socket joints provided with all the other features of the invention may be made without any clearance whatsoever, at the cost of selective matching of the outer diameter dimension of the bearing ring 40 and inner diameter dimension of the shell 28.

A combination compression and seal ring 56 is disposed within the bore 38 of the shell 28 on one side of the bearing ring 40. The combination compression and seal ring 56 has a tapered end face 58 conforming to the shape of the tapered or inclined peripheral surface 50 of the bearing ring 40, and a peripheral cylindrical surface 60 disposed within the bore 38 of the shell 28. A radial annular surface 62 of the combination compression and seal ring 56 is disposed in engagement with the inner surface of the shell end flange 34. The tapered end face 58, the peripheral surface 60 and the annular surface 62 of the combination compression and seal ring 56 define a compression flange 63 integrally molded at one end of a bellows seal 64 having a relatively thin wall flexible tubular body portion 66 terminating in an elastic annular integral garter flange 68. The combination compression and seal ring 56 is made of any appropriate elastomeric material such as natural rubber, synthetic rubber, polyurethane, or the like, and the garter flange 68 at the end of the bellows seal body portion 64 forms the edge of an opening of a much smaller diameter than the largest diameter portion of the stud 12 at the junction line 26 between its tapered surface portion 22 thereof and its reverse taper portion 24. Preferably, the surface of the garter flange 68 has a slight V-shaped surface 70, as seen from a section through the edge, such as to elastically conform with the shape of the stud periphery at the junction of the two tapered surfaces 22 and 24 along the junction line 26 and to remain firmly in position, as shown at FIGS. 2, 3 and 3A.

The tapered end face 58 of the combination compression and seal ring 56 is provided with a plurality of longitudinal grooves 72 which engage the compression ring portion 63 to be subjected to considerable compression stress and to absorb plastic deformation without tearing.

A compression ring 74 is disposed on the other side of the bearing ring 40, symmetrically to the combination compression and seal ring 56. The compression ring 74, made of the same material as the combination compression and seal ring 56, has a tapered end face 76 engageable with the other tapered or inclined peripheral surface 50 of the bearing ring 40, and is also provided with longitudinal stress relieving grooves 72, FIG. 1, a peripheral cylindrical surface 78 and an end annular face 80. When the compression ring 74 is disposed within the bore 38 of the shell 28 as shown at FIGS. 2–3A, its end annular face 80 engages the surface of a transverse flange 82 formed at the edge of a retainer and closure cap 84 which is in the form of a dome-shaped body 86.

The diverse parts forming the ball and socket joint 10 are assembled as illustrated in FIG. 2, with the space 88 between the ball 14 and the interior of the pleated body portion 66 of the bellows seal 64 packed with an appropriate high temperature water-resistant lubricant such as grease, the space 90 between the dome body portion 86 of the retainer closure cap 84 and the flat end face 19 of the ball 18 being also filled with an appropriate lubricant such as grease. After the diverse parts are placed in assembly, as shown at FIG. 2, the end rim 32 of the shell 28 is bent over by swaging, such as to form an annular retaining end flange 92, FIGS. 3 and 3A. The annular retaining flange 92 is formed such as to exert a certain amount of pressure directed parallel to the longitudinal axis of the assembly which applies firmly the flange 82 of the retainer closure cap 84 against the annular surface 80 of the compression ring 74, and such as to exert considerable pressure on the corresponding tapered surface 50 of the bearing ring 40 via the tapered surface 76 of the compression ring 74, now placed under compression. Simultaneously, the bearing ring 40 is displaced to the right, as seen in the drawing, with the result that the compression ring portion 63 of the combination compression and seal ring 56 is compressed between the inclined end face 50 of the bearing ring 40 in engagement with the tapered surface 58 of the compression ring portion 63 and the end flange 34 of the shell 28. The forces exerted by the compression ring 74 and the compression ring portion 63 of the combination compression and seal ring 56 are applied to the opposite inclined surfaces 50 of the split bearing ring 40 with the result that a considerable radial force is exerted on the split bearing ring 40 which causes the spherical bearing surface 42 of the bearing ring to firmly engage the peripheral spherical surface 16 of the ball 14. As the overall diameter of the cylindrical peripheral surface 48 of the bearing ring 40 is, under those conditions, less than the internal diameter of the bore 38 of the shell 28, the cylindrical peripheral surface 48 of the bearing ring is separated from the internal surface of the bore 38 by the clearance space 54.

It will be appreciated that the space 90 behind the retainer closure cap 84, and the space 88 behind the bellows seal 64, both filled with a lubricant such as grease, contain an ample reserve of lubricant which is generally sufficient for the service life of the ball and socket joint 10. The ball and socket joint 10 is hermetically sealed from the ambient, thus preventing not only entrance of dirt or contaminant from the ambient into the joint, but also seepage of the lubricant to the ambient. During assembly of the diverse elements, the lubricating groove 18 on the peripheral surface of the ball 14 and the lubricating grooves 44 on the spherical surface 42 of the bearing ring 40 are also filled with the lubricant, such as grease. During operation of the joint 10, lubricant seeps from the lubricating grooves 44 and 18 and from the spaces 88 and 90 forming lubricant reservoirs to the bearing surfaces in swivelling engagement. The distance separating the two parallel grooves 44 in the bearing ring 40 is preferably such that one of the grooves 44 is placed in communication with the other groove 44 through the ball groove 18 during extreme angulation of the stud 12 relative to the socket assembly, FIG. 3A.

After assembly, the compression ring 74 and the compression ring portion 63 of the combination compression and seal ring 56 have been subjected to a desired amount of radial and longitudinal compression, such that the bearing ring 40 is held with its spherical bearing surfaces 42 in engagement with the spherical peripheral surface 16 of the ball 14, and the clearance 54 between the cylindrical peripheral surface 48 of the bearing ring 40 and the surface of the internal bore 38 of the shell 28 is maintained substantially constant around the peripheral surface 48. Vibrations of relatively small amplitude and small force are absorbed and dampened by the strongly pre-stressed, in compression, elastomeric compression rings 74 and 56, and the vibrations which are dampened by the compression rings are more particularly vibrations in the sonic range which are set up in many vehicles, such as railroad cars for example. Normal running loads are also taken and absorbed by the compression rings. However, when the bearing load increases beyond a predetermined limit, both the compression rings 74 and 56 deform to the point that the clearance 54 between the internal surface of the shell bore 38 and the peripheral cylindrical surface 48 of the bearing ring 40 is reduced to the point that the bearing ring peripheral surface 48 engages the surface of the shell bore 38, thus providing the high load carrying capability to the knuckle or swivel joint 10 according to the invention. As mentioned hereinbefore the clearance 54 may be made as wide or as narrow as desired, or even be nonexistent.

By construction, the entire joint assembly 10 is effectively and integrally sealed from the ambient, without requiring an additional enclosure shell or additional seals. Because of the clearance 54 between the peripheral cylindrical surface 48 of the bearing ring 40 and the surface of the internal bore 38 of the shell 28, the manufacturing tolerances for the internal diameter dimension of the shell bore 38 and for the outer diameter dimension of the bearing ring 40 can be chosen to be very wide without fear of the bearing assembly locking up during assembly.

FIG. 4 illustrates a modification of the invention wherein the previously described bearing ring is replaced by an annular thin metallic bearing ring 92, made of two half sections or of a single section with an appropriate longitudinal slit, not shown, backed up by a simple annular ring 94, in a single solid piece, or with a single slit, or made in two or more portions, and having a generally square or rectangular section. The bearing ring shell member 93 is preferably made of a stamping, with the lubrication grooves 44 formed during stamping. The compression ring 74 is in the form of an annular solid ring 96 of elastomeric material, substantially square or rectangular in section, and the combination compression and bellows seal ring 56 is also in the form of an annular flange 98, substantially square or rectangular in section, integrally molded at an end of the bellows seal 64. The compression rings 74 and 56, after being compressed during assembly, exert a generally radially directed force upon the bearing ring shell 93, and absorb and dampen vibrations and relatively small loads, while heavy loads are carried by the solid backup ring 94, after the compression rings have been further compressed to the point that the clearance 54 normally existing around the periphery of the solid ring 98 between the peripheral surface of the ring and the internal surface of the bore 38 of the shell 28 has been eliminated by the excessive loads, thus causing those surfaces to engage with each other along a line.

FIG. 5 illustrates a structure, identical to the structure of FIGS. 1-3A, except that the combination compression and seal ring 56 is made of separate portions, one being a compression ring 63 substantially identical to the other compression ring 74, and the other the bellows seal 64 made as a separate element provided with a radial end flange 100 compressibly held between the shell flange 34 and the side surface of the compression ring 63. In addition, the inclined surfaces 50 of the bearing ring 40 are provided at their inner portion adjacent to the ring tapered end 46 with a small cylindrical surface 101 forming a step engaging the inner edge of the sealing rings 74 and 63.

FIG. 6 illustrates a structure identical to that of FIGS. 1-3A, except that the shell 28 forms a one-piece structure with the end cap, which is integrally formed as shown at 102, and which is provided with an annular flat portion or flange 104 engaging the outer annular face 80 of the compression ring 74. The knuckle joint 10a of FIG. 6 is assembled by introducing the stud 12 and ball 14 unit with the bearing ring 40 and the compression rings 74 and 56 in position into the bore 38 of the shell 28, the open end of the shell having a straight rim which is subsequently bent over by swaging to form the flange 34.

FIG. 7 illustrates a further modification consisting in substituting for the longitudinally split bearing ring 40, as hereinbefore described, a bearing ring 40 formed of two full and separate bearing rings 110 and 112 which, when placed over the peripheral spherical surface 16 of the ball 14 are symmetrically disposed, as shown, with an annular gap 114 separating one ring from the other. The operation of the knuckle joint 10b of FIG. 7 is the same as that of the prior described structures, except that wear of the bearing surfaces is compensated for by progressive lateral displacement of the rings 110 and 112 towards each other, rather than by progressive radial displacement of a single split ring or of two half rings, under the pre-load forces exerted by the compression rings 74 and 56.

Figure 8:
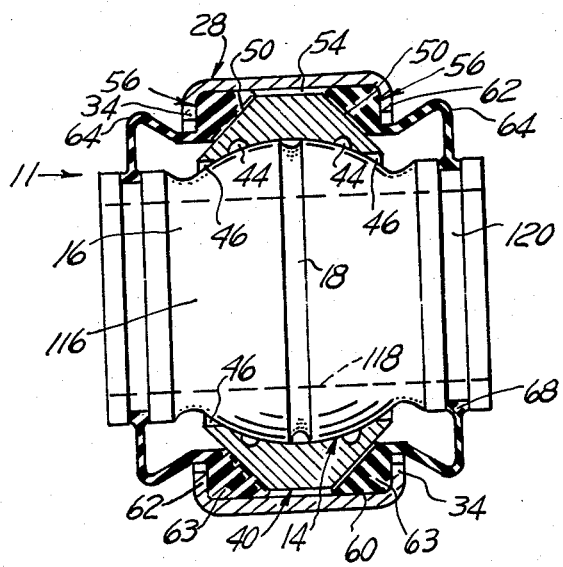
FIG. 8 is a view similar to FIG. 3, but showing a modification thereof for a hollow ball and socket structure.

The principles of the invention are also applicable to knuckle or swivel joints of other types than those hereinbefore described, such as socket and hollow ball joints, an example of which is illustrated at FIG. 8. In the socket and hollow ball joint 11 of FIG. 8, the ball 14 is in the form of a tubular member 116 having a central bore 118 open at both ends, one of the relatively movable members, not shown, connected by the joint 11 being mounted in the bore 116 projecting from both ends of the bore 118. The other member, not shown, is fastened to the outer peripheral surface of the shell 28. The joint 11 has two combination compression and seal rings 56 having their flange portion 63 disposed under compression between each of the end flanges 34 of the shell 28 and the corresponding inclined side face 50 of the split bearing ring 40. The bellows seals 64 are preferably integrally formed with the compression portion 63 of the combination compression and seal ring 56 or, in the alternative, they may be separate members as in the bellows seal structure of FIG. 5. The bellows seals 64 have their end garter flange 68 securely engaged in a peripheral groove 120 formed proximate each end of the hollow ball 116. It will be appreciated by those skilled in the art that the shell 28 is formed with only one of its end flange 34 preformed and, after assembly of the diverse elements, the other end flange 34 is formed by swaging, thus simultaneously placing each compression ring portion 63 of the combination compression and seal rings 56 under compression. It will be appreciated that the operation and capability of the socket and hollow ball joint 11 of FIG. 8 are the same as for the joint structures previously described, and that the bearing ring 40 specifically illustrated may be replaced by the bearing ring of FIG. 4 or FIG. 7. It will further be appreciated that, although the examples of structural embodiments of the invention herein disclosed are examples of ball and socket joints, the principles of the invention are applicable to assemblies having cylindrical bearing surfaces instead of spherical bearing surfaces.

Having thus described the present invention by way of examples of specific structure well adapted to accomplish the objects of the invention, modifications whereof will be apparent to those skilled in the art, what is claimed as new is as follows:

1. A sealed bearing comprising an inner member having a peripheral surface of regular predetermined contour, a tubular shell, a bearing ring disposed in said shell and having a bearing surface in sliding engagement with the peripheral surface of said inner member, said bearing ring having a peripheral surface generally conforming to the inner surface of said shell and fitting in said shell, a pair of resiliently deformable rings each made of elastomeric material and each disposed on one side of said bearing ring, means in said shell holding said deformable rings under compression such as to firmly engage said deformable rings with a portion of said bearing ring for biasing the bearing surface of said bearing ring towards the peripheral surface of said inner member, an elastomeric bellows seal having a flange at an end held by one of said means in said shell for holding one of said deformable rings under compression, said bellows seal having a garter flange at its other end in firm elastic engagement with a portion of the peripheral surface of said inner member, sealing means at the other end of said shell sealing the interior of said shell and said bearing surfaces from the ambient, and a clearance annular space between the peripheral surface of said bearing ring and the inner surface of said shell, wherein radial loads between said bearing inner member and said bearing shell beyond a predetermined load are transmitted by engagement of a portion of said bearing ring peripheral surface with a portion of said shell inner surface.

2. The sealed bearing of claim 1 wherein said sealing means is a second elastomeric bellows seal having a flange at an end held by the other of said means in said shell holding said deformable rings under compression, said bellows seal having a garter flange at its other end in firm elastic engagement with a portion of the peripheral surface of said inner member.

3. The sealed bearing of claim 2 wherein said flange at said end of said second bellows seal is made integral with said resilient deformable ring.

4. The sealed bearing of claim 3 wherein said bearing surface of said bearing ring and said peripheral surface of said inner member are spherical surfaces.

5. The sealed bearing of claim 2 wherein said bearing surface of said bearing ring and said peripheral surface of said inner member are spherical surfaces.

6. The sealed bearing of claim 2 wherein said means in said shell for holding said deformable rings under compression is an integral flange formed at each end of said shell.

7. The sealed bearing of claim 2 wherein said bearing ring has a peripheral cylindrical surface and a pair of symmetrically disposed inclined end faces, said end faces being the portion of said bearing ring in engagement with each of said deformable rings.

8. The sealed bearing of claim 7 wherein said bearing surface of said bearing ring and said peripheral surface of said inner member are spherical surfaces.

9. The sealed bearing of claim 7 wherein said means in said shell for holding said deformable rings under compression is an integral flange formed at each end of said shell.

10. The sealed bearing of claim 2 wherein said bearing ring comprises a first relatively thin ring having a peripheral surface and an inner surface defining said bearing surface and a second ring having a peripheral surface defining said peripheral surface generally conforming to the inner surface of said shell and an inner surface engaged with a portion of the peripheral surface of said first ring, said portion of said bearing ring in engagement with each of said deformable rings being a portion of the peripheral surface of said first ring on each side of said portion engaged by said second ring inner surface.

11. The sealed bearing of claim 10 wherein said means in said shell for holding said deformable rings under compression is an integral flange formed at each end of said shell.

12. The sealed bearing of claim 10 wherein said bearing surface of said bearing ring and said peripheral surface of said inner member are spherical surfaces.

13. The sealed bearing of claim 2 further comprising a lubricant contained in a space behind each of said bellows seal.

14. The sealed bearing of claim 1 wherein said flange at said end of said bellows seal is made integral with said resilient deformable ring.

15. The sealed bearing of claim 14 wherein said means in said shell for holding said deformable rings under compression is an integral flange formed at each end of said shell.

16. The sealed bearing of claim 14 wherein said bearing surface of said bearing ring and said peripheral surface of said inner member are spherical surfaces.

17. The sealed bearing of claim 1 wherein said inner member projects from said shell on an end of said shell, and said sealing means at the other end of said shell comprises an outwardly domed end cap closing the other end of said shell and having an edge flange engaged with the other of said deformable rings.

18. The sealed bearing of claim 17 wherein said flange at said end of said bellows seal is made integral with said resilient deformable ring.

19. The sealed bearing of claim 18 wherein said bearing surface of said bearing ring and said peripheral surface of said inner member are spherical surfaces.

20. The sealed bearing of claim 17 wherein said bearing ring has a peripheral cylindrical surface and a pair of symmetrically disposed inclined end faces, said end faces being the portion of said bearing ring in engagement with each of said deformable rings.

21. The sealed bearing of claim 20 wherein said bearing surface of said bearing ring and said peripheral surface of said inner member are spherical surfaces.

22. The sealed bearing of claim 17 wherein said bearing surface of said bearing ring and said peripheral surface of said inner member are spherical surfaces.

23. The sealed bearing of claim 17 wherein said bearing ring comprises a first relatively thin ring having a peripheral surface and an inner surface defining said bearing surface and a second ring having a peripheral surface defining said peripheral surface generally conforming to the inner surface of said shell and an inner surface engaged with a portion of the peripheral surface of said first ring, said portion of said bearing ring in engagement with each of said deformable rings being a portion of the peripheral surface of said first ring on each side of said portion engaged by said second ring inner surface.

24. The sealed bearing of claim 23 wherein said bearing surface of said bearing ring and said peripheral surface of said inner member are spherical surfaces.

25. The sealed bearing of claim 17 further comprising a lubricant contained in a space behind said bellows seal.

26. The sealed bearing of claim 17 further comprising a lubricant contained in a space behind said bellows seal and in a space behind said end cap.

27. The sealed bearing of claim 1 wherein said bearing ring has a peripheral cylindrical surface and a pair of symmetrically disposed inclined end faces, said end faces being the portion of said bearing ring in engagement with each of said deformable rings.

28. The sealed bearing of claim 27 further comprising a lubricant contained in a space behind said bellows seal.

29. The sealed bearing of claim 28 further comprising a lubricating groove disposed in the peripheral surface of said inner member.

30. The sealed bearing of claim 29 further comprising a lubricating groove disposed in the bearing surface of said bearing ring.

31. The sealed bearing of claim 27 wherein said bearing surface of said bearing ring and said peripheral surface of said inner member are spherical surfaces.

32. The sealed bearing of claim 27 further comprising a lubricant contained in a space behind said bellows seal and in a space behind said sealing means sealing the interior of said shell.

33. The sealed bearing of claim 32 further comprising a lubricating groove disposed in the peripheral surface of said inner member.

34. The sealed bearing of claim 33 further comprising a lubricating groove disposed in the bearing surface of said bearing ring.

35. The sealed bearing of claim 27 wherein said means in said shell for holding said deformable rings under compression is an integral flange formed at each end of said shell.

36. The sealed bearing of claim 1 wherein said bearing ring comprises a first relatively thin ring having a peripheral surface and an inner surface defining said bearing surface and a second ring having a peripheral surface defining said peripheral surface generally conforming to the inner surface of said shell and an inner surface engaged with a portion of the peripheral surface of said first ring, said portion of said bearing ring in engagement with each of said deformable rings being a portion of the peripheral surface of said first ring on each side of said portion engaged by said second ring inner surface.

37. The sealed bearing of claim 36 wherein said means in said shell for holding said deformable rings under compression is an integral flange formed at each end of said shell.

38. The sealed bearing of claim 36 further comprising a lubricant contained in a space behind said bellows seal and in a space behind said sealing means sealing the interior of said shell.

39. The sealed bearing of claim 38 further comprising a lubricating groove disposed in the peripheral surface of said inner member.

40. The sealed bearing of claim 39 further comprising a lubricating groove disposed in the bearing surface of said bearing ring.

41. The sealed bearing of claim 36 further comprising a lubricant contained in a space behind said bellows seal.

42. The sealed bearing of claim 41 further comprising a lubricating groove disposed in the peripheral surface of said inner member.

43. The sealed bearing of claim 42 further comprising a lubricating groove disposed in the bearing surface of said bearing ring.

44. The sealed bearing of claim 36 wherein said bearing surface of said bearing ring and said peripheral surface of said inner member are spherical surfaces.

45. The sealed bearing of claim 1 further comprising a lubricant contained in a space behind said bellows seal.

46. The sealed bearing of claim 1 further comprising a lubricant contained in a space behind said bellows seal and in a space behind said sealing means sealing the interior of said shell.

47. The sealed bearing of claim 1 wherein said means in said shell for holding said deformable rings under compression is an integral flange formed at each end of said shell.

48. The sealed bearing of claim 1 wherein said bearing surface of said bearing ring and said peripheral surface of said inner member are spherical surfaces.

* * * * *